United States Patent Office 2,956,016
Patented Oct. 11, 1960

2,956,016

MINERAL FILTER AID COMPOSITION

Paul W. Leppla, Palos Verdes Estates, Calif., assignor to Great Lakes Carbon Corporation, New York, N.Y., a corporation of Delaware No Drawing. Filed May 6, 1959, Ser. No. 811,257

8 Claims. (Cl. 210—503)

This invention relates to mineral filtration agents used in the clarification of turbid liquids by filtration. More particularly this invention relates to mineral filter aids comprising a mixture of diatomaceous earth filter aid and artificially heat expanded perlite and equivalent materials to produce a final product which is particularly suitable for precoat filtration operations.

Mineral filter aids are used for removing finely divided colloidal suspensoids from liquids. Such filter aids are usually employed by admixing small proportions of the filter aid with the liquid to be filtered and thereafter passing the liquid through a septum (screen, cloth or other permeable support) on which the filter aid and entrained suspended particles are retained while the liquid passes through in a clarified condition. Alternatively, or in conjunction with the practice just described, a precoat of filter aid may be deposited upon a filtration apparatus and the liquid passed through the precoat to remove the undesirable suspended matter.

In order to be fully effective in any given instance the filter aid must retain the greatest possible proportion of the suspended matter originally present in the liquid and must form on the filtration septum a cake which is permeable to the flow of the liquid to be clarified. For convenience these characteristics are measured by "relative clarifying value" and "relative flow rate," respectively. The economics of the operation is also an important factor, this being usually expressed in gallons of filtrate per pound of filter aid. The extent to which these characteristics are developed determines the utility and value of the filter aid for the filtration of any particular turbid liquid.

The term "filter aid" as used herein and in the appended claims includes materials adapted to the foregoing filtration operations. These types of filtration are clearly distinguished from that of a percolation bed in which sand, fuller's earth, gravel and other granular materials are formed into a relatively thick layer through which the liquid to be clarified is passed without previous addition of solids.

The filter aid which has been most commonly used in the filtration and clarification of liquids such as sugar solutions, pharmaceuticals, alcoholic beverages, etc. is based upon diatomaceous earth. The preparation of filter aids of this type is discussed in the ACS Monograph Series No. 52, entitled "Diatomaceous Earth" authored by Robert Calvert. Manufacture of such filter aids is also described in the patent literature, i.e. U.S. Patents 1,477,394, 1,502,547, and Reissue 19,166. It has been found, however, that the use of diatomaceous earth filter aids has its limitations where rotary precoat filters are used. This involves the preparation of a slurry of the diatomaceous earth filter aid, usually in water, and circulating this slurry around a rotating drum which is covered by a cloth, screen or other septum while applying a vacuum to the interior of the drum. This operation builds up a cake of filter aid on the outside surface of the drum and the liquid to be filtered is passed through the cake into the interior of the drum and withdrawn.

Others have proposed to employ expanded perlite, such as that commonly employed as a plaster aggregate, in the filtration of water. While some of these products may be equivalent to sand filters they are unsuited as substitutes for diatomaceous earth in the filtration of the classes of liquids heretofore described.

The primary object of this invention is to produce a filter aid of low cake density and improved clarity characteristics.

It is a further object of the invention to produce filter aids having clarity characteristics similar to the better grades of diatomaceous earth filter aids with improved cake density and resultant economies particularly when used with precoat filters.

In the present description and in the appended claims the term "perlite" is used to embrace a variety of minerals of closely related physical and chemical properties including perlite, pumice, pumicite, obsidian, pitchstone, certain forms of heat expandable volcanic ash and any volcanic glass containing combined water as contrasted with free water (water which is removable on heating the mineral at 100–105° C.).

When perlite minerals are heated to a temperature at which they soften and become plastic (i.e. 1700 to 2300° F.) they expand suddenly and become cellular and very light in apparent density. This expansion is caused by the volume increase of the water combined in the mineral. The product of this artificial expansion consists mainly of multicellular aggregates having thin glassy walls and which are either fully or partially sealed, together with varying percentages of shattered fragments.

The term "diatomaceous earth filter aid" as used herein and in the appended claims designates material prepared from diatomaceous earth by calcining a powdered crushed diatomaceous earth either with or without a fluxing agent in accordance with the disclosures in the references hereinbefore referred to or other fluxing agents known to those skilled in the art, followed by milling and air classifying the resulting calcined product to produce a series of filter aids of varying particle size distribution and flow rates. In some cases a natural (uncalcined) diatomaceous earth filter aid can be used in preparing the products of the invention.

In a broad embodiment the invention comprises a filter aid having a low cake density and consisting essentially of a mixture of diatomaceous earth filter aid, and expanded perlite aggregate having an apparent bulk density of between 1 to 6 lbs. per cubic foot and a particle size distribution from between about 20 to 200 mesh. The two materials are blended in proportion of 50 to 20 percent by weight of diatomaceous earth and from about 20 to 50 percent by weight of the expanded perlite aggregate.

The perlite aggregate is prepared by feeding a crushed and sized raw material into a stream of hot gases at a temperature between 1700 and 2300° F. preferably in such a manner that the particles are subjected to a rapid upheat rate being retained in the hottest expansion zone for a fraction of a second. The expanded product, usually in suspension in the combustion gases, passes into a cooling zone which may be of any convenient design. The product is collected in an apparatus such as a cyclone or a series of such devices wherein the product may be segregated according to the apparent bulk density and particle size, if this is desirable. The expansion is carried out in such a manner that the resulting product will have a bulk density of from 1 to 6 lbs. per cubic foot and the collection operation is so regulated that substantially all the particles will be distributed from between 20 to 200 mesh. The resulting perlite product is then blended by suitable mechanical means with a diatomaceous earth filter aid in proportions of about 50 to 20 percent by weight of the diatomaceous earth filter aid and about 20 to 50 percent by weight of the expanded perlite aggregate. The resulting products are characterized by cake densities lower than the diatomaceous earth filter aid but will have clarity characteristics approaching that of the diatomaceous earth filter aid.

In producing one type of the novel filter aid products which are the subject of this invention attention should be particularly paid to the following features which have been found to be essential:

(1) The expanded perlite aggregate should have an apparent bulk density of between 1 to 6 lbs. per cubic foot. This is measured by permitting the expanded mineral to fall freely into a graduated cylinder and measuring the weight and loose settled volume of a given amount of product.

(2) The expanded perlite aggregate should have a particle size distribution so that substantially all of the particles will be between about 20 to 200 mesh (U.S. standard screen series) the particles being distributed throughout this size range.

(3) The diatomaceous earth filter aid and the expanded cellular perlite aggregate must be blended in proportions of 50 to 20 percent by weight of diatomaceous earth filter aid and about 20 to 50 percent by weight of the aggregate. Most diatomaceous earth filter aids have a cake density of about 18 lbs. per cubic foot or slightly higher. The expanded perlite aggregate and the diatomaceous earth filter aid are proportioned in the aforementioned range so that the filter cake density (defined below) is 18 lbs. per cubic foot or lower, preferably 4 to 10 lbs. per cubic foot. It will be apparent that at the higher weight percentages of perlite aggregate, the apparent bulk density of the latter should be appropriately selected at the higher end of the 1 to 6 range while in products having higher percentages of diatomaceous earth the perlite aggregate should have a bulk density in the lower end of the 1 to 6 range.

(4) The final filter aid products of this form of the invention should have cake densities of 18 lbs. per cubic foot or lower, preferably 4 to 10 lbs. per cubic foot. The cake density of a filter aid is measured by suspending the filter aid in water and passing the water through a screen or cloth filter which will retain the filter aid. The cake density (expressed in pounds per cubic foot) is calculated from the volume and dry weight of the resulting filter cake.

In a specific embodiment of the invention finely ground perlite ore, preferably minus 20 mesh is expanded at a temperature of about 1700° F. by dropping the perlite directly into a flame and conveying the expanded product out of the furnace into a collection cyclone. The resulting product will have a bulk density from 1 to 6 lbs., and preferably from 2 to 4 lbs., per cubic foot and will contain about 90% by volume of material which will float in water. The particle size distribution of this product will be such that at least 75% by weight of the particles will pass a 40 mesh screen and up to 25% by weight of the particles will pass a 100 mesh screen. This expanded perlite material itself is unsuitable for filtration unless blended with from 50 to 20 percent by weight of a diatomaceous earth filter aid prepared in the manner herein described. The resulting filter aid product will have a cake density between 5 to 18 lbs. per cubic foot, depending upon the proportioning of the components and the bulk density of the perlite aggregate. This material is particularly suited for use as a filter aid in connection with the operation of a rotary precoat vacuum filter in which filterable solids are retained on the surface of a rotating drum filter and removed by cutting with a knife upon each revolution of the drum.

In a further embodiment of the invention volcanic ash is expanded at a furnace temperature of about 1800° F. by dropping the mineral directly into the flame of a burner. The resulting product has an apparent bulk density of about 2.3 lbs. per cubic foot and consists of 85% by volume of material which will float in water. Fifty percent by weight of this material was blended with a diatomaceous earth filter aid prepared as previously described and the resulting product was found to be particularly suitable as a filter aid in connection with the operation of a rotary precoat vacuum filter.

In a further embodiment of the invention the cyclone fines from a perlite expansion operation designed to produce mainly plaster aggregate of about 8 lbs. per cubic foot apparent bulk density was air classified to reduce the amount of material which will sink or subside in water to a level of 20% by volume. The resulting product had an apparent bulk density of 5 lbs. per cubic foot and the majority of the product passed a 100 mesh screen. This material in itself is not suitable as a filter aid but when blended with from 50 to 20 percent by weight of diatomaceous earth filter aid produces a product having excellent filtration characteristics.

In accordance with this invention the expanded cellular perlite aggregate prepared according to the procedures previously described is blended in the proper proportions with various types of diatomaceous earth filter aids. The latter are selected based upon flow rate and clarity considerations. For example, in Tables 1, 2 and 3 are set forth the particle size distribution (in microns), both serially and cumulatively, of various diatomaceous earth filter aids which can be used as a component in the novel filter aid products which are the subject of this invention. The figures were obtained by using ASTM Method No. D422-39 on the minus 325 mesh portion of the filter aid.

*Table 1*

HIGH FLOW RATE PRODUCT

Particle Size Distribution—Serial

| Specimen No. | 1 | 2 | 3 |
| --- | --- | --- | --- |
| Below 3 mu | 3 | 6 | 0 |
| 3 to 6 mu | 14 | 10 | 1 |
| 6 to 10 mu | 30 | 26 | 15 |
| 10 to 20 mu | 42 | 30 | 52 |
| 20 to 40 mu | 8 | 15 | 21 |
| Above 40 mu | 3 | 13 | 11 |

Particle Size Distribution—Cumulative

| Below 3 mu | 3 | 6 | 0 |
| --- | --- | --- | --- |
| Below 6 mu | 17 | 16 | 1 |
| Below 10 mu | 47 | 42 | 16 |
| Below 20 mu | 90 | 72 | 68 |
| Below 40 mu | 97 | 87 | 89 |
| Above 40 mu | 3 | 13 | 11 |

*Table 2*

MEDIUM FLOW RATE PRODUCT

Particle Size Distribution—Serial

| Specimen No. | 4 | 6 | 7 | 8 |
| --- | --- | --- | --- | --- |
| Below 3 mu | 12 | 6 | 6 | 6 |
| 3 to 6 mu | 36 | 24 | 14 | 17 |
| 6 to 10 mu | 36 | 45 | 40 | 36 |
| 10 to 20 mu | 11 | 22 | 30 | 34 |
| 20 to 40 mu | 1 | 3 | 9 | 7 |
| Above 40 mu | 4 | 0 | 1 | 0 |

Particle Size Distribution—Cumulative

| Below 3 mu | 12 | 6 | 6 | 6 |
| --- | --- | --- | --- | --- |
| Below 6 mu | 48 | 30 | 20 | 17 |
| Below 10 mu | 84 | 75 | 60 | 64 |
| Below 20 mu | 95 | 97 | 90 | 94 |
| Below 40 mu | 96 | 100 | 99 | 99 |
| Above 40 mu | 4 | 0 | 1 | 1 |

Table 3

Particle Size Distribution—Serial

| Specimen No. | 11 | 12 | 13 |
|---|---|---|---|
| Below 3 mu | 22 | 34 | 28 |
| 3 to 6 mu | 67 | 50 | 52 |
| 6 to 10 mu | 8 | 14 | 18 |
| 10 to 20 mu | 2 | 2 | 2 |
| 20 to 40 mu | 1 | 0 | 0 |
| Above 40 mu | 0 | 0 | 0 |

Particle Size Distribution—Cumulative

| | | | |
|---|---|---|---|
| Below 3 mu | 22 | 34 | 28 |
| Below 6 mu | 89 | 84 | 80 |
| Below 10 mu | 97 | 98 | 98 |
| Below 20 mu | 99 | 100 | 100 |
| Below 40 mu | 100 | 0 | 0 |
| Above 40 mu | 0 | 0 | 0 |

In a preferred embodiment of the invention an expanded cellular perlite aggregate having a bulk density of 3 to 4 lbs. per cubic foot was selected, having the following particle size characteristics:

25% minus 100 mesh
75% minus 40 mesh

This material contained 9% by volume of product which subsided in water when the product was slurried in this medium. This material was blended with a diatomaceous earth filter aid having the following particle size distribution:

12% 0 to 3 microns
55% 3 to 10 microns
22% 10 to 20 microns
9% 20 to 40 microns
2% plus 40 microns Various blends of these two materials were made and the resulting products tested as follows:

A standard 60° Brix aqueous solution of raw sugar at 80° C. was prepared. To samples of this liquid were added 0.3% of filter aid (based upon the solids content of the sugar solution). The resulting slurry was passed through a ¾" diameter filter over a 21 minute cycle with a constant pressure of 10 lbs. per square inch gauge with the following results. For comparative purposes, the diatomaceous earth filter aid is used as a standard and assigned a clarity value of 100.

Table 4

| Sample No. | D.E. (Wt. Percent) | Perlite (Wt. Percent) | Cake Density | Relative Clarity |
|---|---|---|---|---|
| 1 | 0 | 100 | 4.2 | 0 |
| 2 | 10 | 90 | 5.0 | 16 |
| 3 | 20 | 80 | 5.5 | 65 |
| 4 | 50 | 50 | 6.6 | 77 |
| 5 | 75 | 25 | 11.5 | 87 |
| 6 | 80 | 20 | 12.0 | 90 |
| 7 | 90 | 10 | 16.2 | 94 |
| 8 | 100 | 0 | 20.4 | 100 |

From the above data it is apparent that samples Nos. 3, 4, 5 and 6 which are products of the invention are characterized by low cake density and clarities well within the minimum generally accepted value of 65.

Comparative tests were made on an 8 foot diameter by 8 foot long rotary vacuum precoate filter operating on citrus pectin liquor. The filtration surface was 200 square feet. To produce a 2 inch thick precoat, 33.5 cubic feet of filter aid cake was required. Using the most suitable diatomite filter aid for this system, 670 pounds of filter aid were required to build up a cake of 2 inch thickness, since this filter aid deposits at 20 pounds per cubic foot.

With the drum operating at a speed of one-third revolution per minute, a 0.005 inch cut per revolution was found to represent the minimum cut at which steady state conditions could be obtained. At this cut, the filtration rate was 14 gallons per squart foot per hour, and the filter aid consumption was 13.7 pounds per 1000 gallons of filtrate.

After the completion of the cycle, the filter was washed clean and a precoat of the filter aid of the invention was tested consisting of 25% by weight diatomaceous earth and 75% by weight expanded perlite of the type used in sample No. 1. Only 250 pounds of this material was necessary to develop the required 2 inch precoat cake. Thus, this filter aid required only 6 pounds per cubic foot of filter cake. After the precoating operation was completed, the pectin liquor was introduced. Good, stable operation was achived at a cut of 0.010 inch per revolution. At the same drum speed as in the test with diatomaceous earth filter aid, a filtration rate of 18 gallons per square foot per hour was observed. At the completion of the cycle, calculations showed that only 5.6 pounds of filter aid were expended per thousand gallons of filtrate.

Another embodiment of the invention comprises a filter aid having a filter cake density between about 7 to 18 lbs. per cubic foot and consisting essentially of about 10 to 50 percent by weight of diatomaceous earth filter aid and from about 90 to 50 percent by weight of another type of expanded perlite aggregate, the latter having a filter cake density between about 6 to 15 lbs. per cubic foot and a particle size distribution such that not more than 40 percent by weight of the particles will be smaller than 10 microns and not more than 20 percent by weight of the particles will be larger than 150 microns.

The above perlite aggregate is prepared by feeding a crushed and sized raw material into a stream of hot gases at a temperature between 1700 and 2300° F. in such a manner that the particles are rapidly heated and retained in the hottest zone for a fraction of a second. The expanded product, usually in suspension in the combustion gases, passes into a cooling zone which may be of any convenient design. The product is collected in an apparatus such as a cyclone or a series of such devices wherein the product may be segregated according to the apparent bulk density, and particle size if this is desirable. The expansion is carried out in such a manner that the resulting product will have a bulk density of from 1 to 6 lbs. per cubic foot. The resulting product is milled to reduce the proportion of expanded aggregate which will float in water, preferably such that not more than 90 percent nor less than 25 percent by volume of the milled particles will float in water. In addition, this aggregate is either screened, air classified or otherwise suitably treated to achieve the necessary particle size distribution so that not more than 40 percent by weight of the particles will be smaller than 10 microns and not more than 20 percent by weight will be larger than 150 microns the distribution conforming approximately to a log probability curve. The resulting perlite product is then blended by a suitable mechanical means with a diatomaceous earth filter aid in proportions of about 90 to 40 percent by weight of the perlite product to between about 10 to 60 percent by weight of diatomaceous filter aid. The resulting products are characterized by cake densities lower than the diatomaceous filter aid but will have clarity characteristics approaching that of the diatomaceous earth filter aid. They are particularly suitable for use with a rotary precoat filter.

In producing this type of novel filter aid products which are the subject of this invention I have found the following features to be essential:

(1) The expanded perlite aggregate from which the perlite component of these products is prepared should have an apparent bulk density between 1 to 6 lbs. per cubic foot. Apparent bulk density is measured by permitting the expanded mineral to fall freely into a graduated cylinder and measuring the weight and loose settled volume of a given amount of product.

(2) The expanded perlite aggregate should have a particle size distribution such that not more than 40 percent (preferably not more than 25%) by weight of the particles will be smaller than 10 microns and not more than 20 percent by weight of the particles will be larger than 150 microns. Also, this component should have a filter cake density between about 6 to 15 lbs. per cubic foot.

(3) The diatomaceous earth filter aid and the expanded perlite aggregate must be blended in proportions of 10 to 50 percent by weight of the diatomaceous earth filter aid and about 90 to 50 percent by weight of the expanded perlite aggregate. A preferred range will be about 25 to 50 percent by weight of diatomaceous earth filter aid and from about 75 to 50 percent by weight of expanded perlite aggregate.

(4) The expanded perlite product should preferably contain not less than 25 percent nor more than 90 percent by volume of particles which when the perlitic product is slurried or suspended in water, will float in this medium.

(5) The expanded perlite product and the diatomaceous earth filter aid are, when blended in the above-mentioned ranges, should have a filter cake density (defined below) below 18 lbs. per cubic foot, preferably 7.9 lbs. per cubic foot. It will be apparent that at the higher weight percentages of perlite aggregate the filter cake density of the latter should be chosen such as products having a cake density towards the higher end of this range will be used, whereas in the case of products having higher percentages of diatomaceous earth, a perlite aggregate having a filter cake density in the lower end of the 1 to 6 range should be selected.

(6) The final filter aid products of this form of the invention should have filter cake densities of 18 lbs. per cubic foot or less, preferably 7 to 9 lbs. per cubic foot. The cake density of filter aid is measured by suspending the filter aid in water and passing the water through a screen or cloth filter which will retain the filter aid. The filter cake density (expressed in lbs. per cubic foot) is calculated from the volume and dry weight of the resulting filter cake.

In another embodiment of the invention a finely ground perlite ore, preferably minus 20 mesh is expanded at a temperature of about 1700° F. by dropping the perlite directly into a flame and conveying the expanded product out of the furnace into a collection cyclone. The resulting product will have a bulk density between 1 to 6 lbs., and preferably between 2 to 4 lbs. per cubic foot and will normally contain about 90 percent by volume of material which will float in water. This product is then ground, milled or otherwise comminuted to destroy in varying degrees the cellular property of the product. In most cases this second type of expanded perlite product will have not more than 90 nor less than 25 percent by volume of particles which will float in water. The milled product is screened or air classified to produce a product in which the particle size distribution is such that not more than 25 percent by weight of the particles will be smaller than 10 microns and not more than 20 percent by weight of the particles will be larger than 150 microns.

This product is then blended with from 10 to 50 percent by weight of a diatomaceous earth filter aid, the resulting products being particularly well suited for use on a rotary vacuum precoat filter.

In a further embodiment of the invention a perlite aggregate of the type just described and having a filter cake density between 7 to 15 lbs. per cubic foot is blended with a diatomaceous earth filter aid in proportions of from about 25 to 50 percent by weight of the latter material and from about 75 to 50 percent by weight of the perlite product. This material is particularly suitable for use in a rotary vacuum precoat filter.

In a further embodiment of the invention a perlite product prepared as just described and having a filter cake density between about 9 to 11 lbs. per cubic foot is selected so that about 75 percent by weight of the perlite aggregate particles are smaller than 140 microns and 25 percent by weight are larger than 30 microns.

In a further embodiment of the invention volcanic ash is expanded at a furnace temperature of about 1800° F. by dropping the mineral directly into the flame of a burner. The resulting product has an apparent bulk density of about 2.3 lbs. per cubic foot and contains 85 percent by volume of material which will float in water. This product is milled in a fan blower and air classified so that 75 percent by weight of the particles are smaller than 50 microns and 25 percent by weight are smaller than 30 microns. This material has a filter cake density of from about 8 to 18 lbs. per cubic foot. A blend of 25 to 50 percent by weight of the latter material and from about 75 to 50 percent by weight of the perlite product produced a composite filter aid particularly suitable for use on a precoat filter.

In a further embodiment of the invention the cyclone fines from a perlite expansion operation designed to produce mainly plaster aggregate of about 8 lbs. per cubic foot apparent bulk density are air classified to reduce the amount of material which will sink or subside in water to a level of 20 percent by volume. The resulting product has an apparent bulk density of 5 lbs. per cubic foot and the majority of the product passes a 100 mesh screen. This product is milled to destroy about 50 percent of the cellular structure of the aggregate and air classified into a product which has a particle size distribution such that from about 5 to 20 percent by weight of the particles are larger than 150 microns and not more than 10 percent by weight of the particles are smaller than 10 microns. These products have a filter cake density of about 6 to 8 lbs. per cubic foot. When blended with a diatomaceous earth filter aid in proportions of from about 10 to 50 percent by weight of the latter material and from about 90 to 50 percent by weight of the perlite product the resulting filter aid has a filter cake density of 7 to 9 lbs. per cubic foot and is particularly suitable as a filter aid or a rotary vacuum precoat filter.

In a further embodiment of the invention a comminuted perlite ore, minus 50 mesh, is expanded at a temperature of about 1800° F. in such a manner that the resulting product consists of a mixture of particles having a cellular structure in particles whose cellular structure has been destroyed by the expansion operation and which will subside in water, so that the total product will consist of a mixture of these particles and will contain not more than 90 percent nor less than 25 percent by volume by particles which float in water. These products have a filter cake density of 8 to 15 lbs. per cubic foot. When blended with a diatomaceous earth filter aid in proportions from about 10 to 50 percent by weight of the latter material and from about 90 to 50 percent by weight of the expanded perlite material, the resulting filter aid is highly desirable for use on a rotary vacuum precoat filter.

In accordance with this invention the second type of expanded perlite aggregate prepared according to the procedures herein described is blended in the proper proportions with various types of diatomaceous earth filter aids. The latter are selected based upon flow rate and clarity considerations. For example, in Tables 5, 6 and 7 are set forth the particle size distribution (in microns), both serially and cumulatively, of various diatomaceous earth filter aids which can be used as a component in the novel filter aid products which are the subject of this invention. The figures were obtained by using ASTM Method No. D422-39 on the minus 325 mesh portion of the filter aid.

Table 5
HIGH FLOW RATE PRODUCT
Particle Size Distribution—Serial

| Specimen No. | 1 | 2 | 3 |
|---|---|---|---|
| Below 3 mu | 3 | 6 | 0 |
| 3 to 6 mu | 14 | 10 | 1 |
| 6 to 10 mu | 30 | 26 | 15 |
| 10 to 20 mu | 42 | 30 | 52 |
| 20 to 40 mu | 8 | 15 | 21 |
| Above 40 mu | 3 | 13 | 11 |

Particle Size Distribution—Cumulative

| | 1 | 2 | 3 |
|---|---|---|---|
| Below 3 mu | 3 | 6 | 0 |
| Below 6 mu | 17 | 16 | 1 |
| Below 10 mu | 47 | 42 | 16 |
| Below 20 mu | 90 | 72 | 68 |
| Below 40 mu | 97 | 87 | 89 |
| Above 40 mu | 3 | 13 | 11 |

Table 6
MEDIUM FLOW RATE PRODUCT
Particle Size Distribution—Serial

| Specimen No. | 4 | 6 | 7 | 8 |
|---|---|---|---|---|
| Below 3 mu | 12 | 6 | 6 | 6 |
| 3 to 6 mu | 36 | 24 | 14 | 17 |
| 6 to 10 mu | 36 | 45 | 40 | 36 |
| 10 to 20 mu | 11 | 22 | 30 | 34 |
| 20 to 40 mu | 1 | 3 | 9 | 7 |
| Above 40 mu | 4 | 0 | 1 | 0 |

Particle Size Distribution—Cumulative

| | 4 | 6 | 7 | 8 |
|---|---|---|---|---|
| Below 3 mu | 12 | 6 | 6 | 6 |
| Below 6 mu | 48 | 30 | 20 | 17 |
| Below 10 mu | 84 | 75 | 60 | 64 |
| Below 20 mu | 95 | 97 | 90 | 94 |
| Below 40 mu | 96 | 100 | 99 | 99 |
| Above 40 mu | 4 | 0 | 1 | 1 |

Table 7
LOW FLOW RATE PRODUCT
Particle Size Distribution—Serial

| Specimen No. | 11 | 12 | 13 |
|---|---|---|---|
| Below 3 mu | 22 | 34 | 28 |
| 3 to 6 mu | 67 | 50 | 52 |
| 6 to 10 mu | 8 | 14 | 18 |
| 10 to 20 mu | 2 | 2 | 2 |
| 20 to 40 mu | 1 | 0 | 0 |
| Above 40 mu | 0 | 0 | 0 |

Particle Size Distribution—Cumulative

| | 11 | 12 | 13 |
|---|---|---|---|
| Below 3 mu | 22 | 34 | 28 |
| Below 6 mu | 89 | 84 | 80 |
| Below 10 mu | 97 | 98 | 98 |
| Below 20 mu | 99 | 100 | 100 |
| Below 40 mu | 100 | 0 | 0 |
| Above 40 mu | 0 | 0 | 0 |

In a preferred embodiment of the invention an expanded cellular perlite aggregate having a bulk density of 3 to 4 lbs. per cubic foot was selected, having the following particle size characteristics:

75 percent minus 36 microns
25 percent minus 7 microns

This material contained 50 percent by volume of product which subsided in water when the product was slurried in this medium. This material was blended with a diatomaceous earth filter aid having the following particle size distribution:

12% 0 to 3 microns
55% 3 to 10 microns
22% 10 to 20 microns
9% 20 to 40 microns
2% plus 40 microns Various blends (by weight) of these two materials were made and the resulting products tested in the case of Examples 1 to 8.

Table 8

| Sample No. | Percent Perlite | Percent Diatomaceous Earth | Cake Density (Lbs./Cu. Ft.) | Clarity | Expected Clarity |
|---|---|---|---|---|---|
| 9 | 100 | 0 | 13.6 | 73 | 73 |
| 10 | 90 | 10 | 14.2 | 90 | 75 |
| 11 | 75 | 25 | 15.0 | 102 | 80 |
| 12 | 50 | 50 | 16.5 | 95 | 87 |
| 13 | 40 | 60 | 17.0 | 92 | 90 |
| 14 | 30 | 70 | 18.0 | 90 | 92 |
| 15 | 0 | 100 | 20.4 | 107 | 107 |

In a further embodiment of the invention an expanded cellular perlite aggregate having a bulk density of 3 to 4 lbs. per cubic foot was milled to produce a product containing about 30 percent by volume of aggregate which floats in water. The milled product had the following particle size characteristics:

25% by weight minus 12 microns
75% by weight minus 145 microns

The above material was blended with the diatomaceous earth product used in samples illustrated in Table 4 in varying proportions (by weight) and tested as a filter aid on the raw sugar solution. The data appear in Table 5.

Table 9

| Sample No. | Percent Perlite | Percent Diatomaceous Earth | Cake Density (Lbs./Cu. Ft.) | Clarity | Expected Clarity |
|---|---|---|---|---|---|
| 9 | 100 | | 9.5 | 60 | 60 |
| 16 | 90 | 10 | 9.8 | 86 | 64 |
| 17 | 75 | 25 | 10.4 | 106 | 71 |
| 18 | 50 | 50 | 12.7 | 97 | 83 |
| 19 | 40 | 60 | 14.1 | 92 | 88 |
| 20 | 30 | 70 | 16.0 | 90 | 91 |
| 15 | 0 | 100 | 20.4 | 107 | 107 |

From the above data it is apparent that samples Nos. 10 through 13 and 16 through 18, which are products of the invention, are characterized by lower cake densities and superior clarity values than would be expected based on a purely additive result, the clarity values of the products of the invention being well within the minimum generally accepted value of 65.

Comparative tests were made on an 8 foot diameter by 8 foot long rotary vacuum precoat filter operating on citrus pectin liquor. The filtration surface was 200 square feet. To produce a 2 inch thick precoat, 33.5 cubic feet of filter aid cake was required. Using the most suitable diatomite filter aid for this system, 670 pounds of filter aid were required to build up a cake of a 2 inch thickness, since this filter aid deposits at 20 pounds per cubic foot.

With the drum operating at a speed of one-third revolution per minute, a 0.005 inch cut per revolution was found to represent the minimum cut at which steady state conditions could be obtained. At this cut, the filtration rate was 14 gallons per square foot per hour, and the filter aid consumption was 13.7 pounds per 1000 gallons of filtrate.

After the completion of the above cycle the filter was washed clean and a precoat filter aid according to Example No. 17 was tested. Only 360 lbs. of this product was necessary to develop the required 2 inch precoat cake. Therefore, this filter aid required only 11 lbs. per cubic foot of filter cake. After the precoating operation was completed the pectin liquor was introduced. A satisfactory operation was established at a cut of 0.005 inches per revolution. At the same drum speed as in the test of the diatomaceous earth filter aid a filtration rate of 13 gallons per square foot per hour was observed. At the completion of the cycle calculations showed that only 7 lbs. of filter aid were expanded per thousand gallons of filtrate.

It will be apparent from the foregoing data, particularly in Tables 4 and 5, that not more than 90 percent or less than 50 percent by weight of the expanded perlite aggregate should be blended with a diatomaceous earth filter aid in order to improve the cake density and clarity characteristics of the products of the invention.

This application is a continuation-in-part of my copending applications Ser. No. 563,179 filed February 3, 1956 and Ser. No. 567,068 filed February 23, 1956, both for "Mineral Filter Air Composition" and both now abandoned.

Having thus described the novel filter aid products which are the subject of the invention and the methods for producing such products, both generally and by way of exemplification, but with no intention of limiting the invention by the details set forth herein.

I claim:

1. A filter aid having a filter cake density of between about 4 to 18 lbs. per cubic foot comprising essentially a mixture of from about 50 to 20 percent by weight of diatomaceous earth filter aid, and from about 50 to 80 percent by weight of expanded perlite aggregate having an apparent bulk density of between about 1 to 6 lbs. per cubic foot and a particle size distribution ranging between about 20 to 200 mesh, not more than about 20 percent by volume of said expanded perlite particles having the property of subsiding in water.

2. A product according to claim 1 wherein the apparent bulk density of the perlite aggregate is between about 2 to 4 lbs. per cubic foot and the filter cake density of the filter aid product is between about 5 to 10 lbs. per cubic foot.

3. A filter aid having a filter cake density between about 7 to 18 lbs. per cubic foot comprising essentially about 10 to 50 percent by weight of diatomaceous earth filter aid, and from about 90 to 50 percent by weight of expanded perlite aggregate having a filter cake density of between about 8 to 15 lbs. per cubic foot and a particle size distribution such that not more than 25 percent by weight of the particles will be smaller than 10 microns and not more than 20 percent by weight of the particles will be larger than 150 microns and further having not more than 90 percent nor less than 25 percent by volume of particles which float in water.

4. A filter aid having a filter cake density between about 7 to 18 lbs. per cubic foot comprising essentially about 25 to 50 percent by weight of diatomaceous earth filter aid and from about 75 to 50 percent by weight of expanded perlite aggregate having a filter cake density between about 7 to 15 lbs. per cubic foot and a particle size distribution such that not more than 25 percent by weight of the particles will be smaller than 10 microns and not more than 20 percent by weight of the particles will be larger than 150 microns and further having not more than 90% nor less than 25% by volume of particles which float in water.

5. A product according to claim 3 wherein about 75 percent by weight of the perlite aggregate particles are smaller than 140 microns and 25 percent by weight are smaller than 30 microns, said perlite aggregate being further characterized by having a filter cake density between about 9 to 11 lbs. per cubic foot.

6. A product according to claim 3 wherein about 75 percent by weight of the expanded perlite particles are smaller than 50 microns and between about 10 to 40 percent by weight are smaller than 10 microns.

7. A product according to claim 4 wherein the expanded perlite aggregate has a filter cake density of from about 8 to 10 lbs. per cubic foot.

8. A filter aid having a filter cake density between about 7 to 9 lbs. per cubic foot comprising essentially about 10 to 50 percent by weight of diatomaceous earth filter aid, and from about 90 to 50 percent by weight of expanded perlite aggregate having a filter cake density between about 6 to 8 lbs. per cubic foot and a particle size distribution such that from about 5 to 20 percent by weight of the particles will be larger than 150 microns and not more than 10 percent by weight of the particles will be smaller than 10 microns and further having not more than 90% nor less than 25% by volume of particles which float in water.

References Cited in the file of this patent

UNITED STATES PATENTS

| Re. 19,166 | Thatcher | May 15, 1934 |
| 2,665,813 | Bollaert et al. | Jan. 12, 1954 |
| 2,683,690 | Armentrout | July 13, 1956 |
| 2,798,674 | Denning | July 9, 1957 |

OTHER REFERENCES

"California Journal of Mines and Geology," vol. 44, No. 3, July 1948, page 308.

"Chemical and Metallurgical Engineering," vol. 52, July 1945, pages 140 and 142.

UNITED STATES PATENT OFFICE
CERTIFICATE OF CORRECTION

Patent No. 2,956,016                                    October 11, 1960

Paul W. Leppla

It is hereby certified that error appears in the printed specification of the above numbered patent requiring correction and that the said Letters Patent should read as corrected below.

Column 1, line 32, for "liquid" read -- liquor --; column 2, line 53, and column 3, lines 3 and 27, for "about 20 to 50 percent by weight", each occurrence, read -- about 50-80 percent by weight --; column 5, line 68, for "precoate" read -- precoat --; column 6, line 17, for "achived" read -- achieved --; column 11, line 1, for "expanded" read -- expended --; line 11, for "Air" read -- Aid --.

Signed and sealed this 11th day of April 1961.

(SEAL)
Attest:

ERNEST W. SWIDER
Attesting Officer

ARTHUR W. CROCKER
                                                      Acting Commissioner of Patents